(12) United States Patent
Hsiao

(10) Patent No.: US 7,365,329 B2
(45) Date of Patent: Apr. 29, 2008

(54) METHOD FOR DETERMINING LOCATION OF INFRARED-CUT FILTER ON SUBSTRATE

(75) Inventor: Bor-Yuan Hsiao, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/586,974

(22) Filed: Oct. 26, 2006

(65) Prior Publication Data

US 2007/0262258 A1 Nov. 15, 2007

(30) Foreign Application Priority Data

May 12, 2006 (CN) ............ 2006 1 0060629

(51) Int. Cl.
*G01J 5/02* (2006.01)
(52) U.S. Cl. .................. 250/341.1; 356/239.2
(58) Field of Classification Search ........ 250/341.1, 250/341.2, 341.3, 341.4, 341.5, 341.6, 341.7, 250/341.8, 226, 482.1; 356/10, 414, 416, 356/419, 239.2; 359/350, 356, 339, 308, 359/590, 588, 359, 885, 891
See application file for complete search history.

(56) References Cited

U.S. PATENT DOCUMENTS 4,015,127 A * 3/1977 Sharkins ............... 250/341.3
2003/0230720 A1* 12/2003 Shelley et al. ........... 250/341.8

* cited by examiner

*Primary Examiner*—Kiesha Rose
*Assistant Examiner*—Kiho Kim
(74) *Attorney, Agent, or Firm*—Jeffrey T. Knapp

(57) ABSTRACT

A method for determining a location of IR-cut filter film on a substrate, the filter film and the substrate cooperatively functioning as an IR-cut filter, includes the steps of: providing an infrared laser device, an IR-cut filter and an infrared laser sensor; emitting a laser from the IR laser device to a surface of the IR-cut filter in a manner such that the laser beam is obliquely incident on an edge portion of the IR-cut filter; and determining the location of the filter film on the substrate of the IR-cut filter in such a way that, if the intensity of the laser beam received by the infrared sensor is equal to or close to zero, the location of the filter film is on a surface of the substrate facing towards the infrared laser device; if the intensity of the laser beam received by the infrared sensor is the same as or close to an intensity of the laser beam emitted from the infrared laser device, the location of the filter film is on a surface of the substrate facing away from the infrared sensor.

9 Claims, 5 Drawing Sheets

METHOD FOR DETERMINING LOCATION OF INFRARED-CUT FILTER ON SUBSTRATE

BACKGROUND OF THE INVENTION

1. Field of the Invention

The present invention generally relates to a method for determining location of an infrared-cut (IR-cut) filter film on a substrate.

2. Description of Related Art

With development of multimedia technology, image pick-up devices, such as digital cameras and video cameras are popular with customers. With current demand for miniaturization of such devices, quality of images produced by such devices is required to be high. The quality of such images is determined by quality of optical elements contained in the image pick-up devices.

Generally, an image pick-up device includes a lens module, and an image sensor, such as a charge coupled device (CCD) or a complementary metal oxide semiconductor device (CMOS). Responsive wavelengths of the CCD or CMOS ranges from 350 to 1500 nanometers and a wavelength of visible light ranges from 400 to 700 nanometers, infrared light, whose wavelength is longer than 700 nanometers, will cause image sensor errors, reducing quality of image produced by such an image sensor.

For this reason, an IR-cut filter is introduced into the lens module of the image pick-up device for filtering out the infrared light. The IR-cut filter includes a substrate and an IR-cut filter film on a surface of the substrate.

In process of assembling the lens modules, to maintain levels of optical consistency of each lens module, a location of the filter film on the substrate must be determined to make sure that a direction of orientation of the location of the filter film on the surface assembled in each lens module is identical.

What is needed, therefore, is a method for determining a location of the filter film on the substrate.

SUMMARY OF THE INVENTION

A method for determining location of an infrared-cut (IR-cut) filter film on a substrate, the filter film and the substrate cooperatively functioning as an IR-cut filter, according to one preferred embodiment includes the steps of: providing an IR laser device, the filter film and an IR laser sensor, the IR-cut filter being arranged between the IR laser device and the IR laser sensor, the IR laser device and the IR laser sensor being aligned with each other; emitting an IR laser beam from the IR laser device to a surface of the IR-cut filter in a manner such that the IR laser beam is obliquely incident on an edge portion of the IR-cut filter at an incident angle θ, and a width L of the IR laser beam satisfies the following equation: L=D×sin θ, wherein, D represents a thickness of the substrate; and determining the location of the filter film on the substrate in such a way that, if a light intensity of the IR laser beam received by the IR sensor is equal to or close to zero, the IR-cut filter film is on a surface of the substrate facing towards the IR laser device, if the light intensity of the IR laser beam received by the IR sensor is equal to or close to a light intensity of the IR laser beam emitted from the IR laser device, the filter film is located on a surface of the substrate facing towards the IR laser sensor.

A method for determining location of an IR-cut filter film on a substrate, the filter film and the substrate cooperatively functioning as an IR-cut filter, according to another preferred embodiment includes the steps of: providing an IR laser device, the IR-cut filter and an IR laser sensor, the IR laser device being configured for emitting an IR laser beam onto the filter, the IR laser sensor being configured for receiving the IR laser beam reflected from the filter; emitting an IR laser beam from the IR laser device to a surface of the IR-cut filter in a manner such that the IR laser beam is obliquely incident on an edge portion of the IR-cut filter at an incident angle θ, and a width L of the IR laser beam satisfies the following equation: L=D×sin θ, wherein, D represents a thickness of the substrate; and determining the location of the filter film on the substrate in such a way that, if a light intensity of the IR laser beam received by the IR sensor is equal to or close to a light intensity of the IR laser beam emitted from the IR laser device, the filter film is located on a surface of the substrate facing towards the IR laser device; if the light intensity of the IR laser beam received by the IR sensor is equal to or close to zero, the filter film of the substrate is located on a surface of the substrate facing away from the IR laser device.

A method for determining location of a filter film on a substrate, the filter film being for blocking light of a predetermined wavelength from passing therethrough, the filter film and the substrate cooperatively functioning as a filter, according to another preferred embodiment includes the steps of emitting a light beam of the predetermined wavelength with a first light intensity in a manner such that the light beam is obliquely incident on an edge portion of the substrate at a first side thereof; receiving the light beam with a second light intensity reflected from or transmitting through and exiting from the edge portion of the substrate; and determining the location of the filter film on the substrate based on a difference between the first and second light intensity of the light beam.

Advantages and novel features will become more apparent from the following detailed description of the present method, when taken in conjunction with the accompanying drawings.

BRIEF DESCRIPTION OF THE DRAWINGS

Many aspects of the present method can be better understood with reference to the following drawings. The components in the drawings are not necessarily drawn to scale, the emphasis instead being placed upon clearly illustrating the principles of the present method. Moreover, in the drawings, like reference numerals designate corresponding parts throughout the several views.

Figure 1:
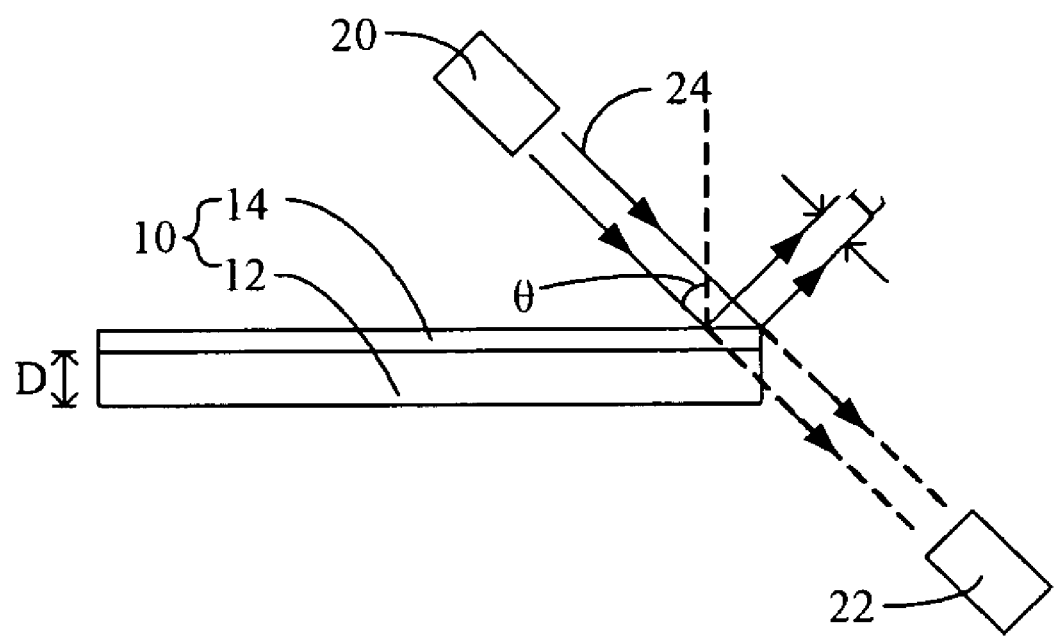
FIGS. 1 to 2 are explanatory views of a method for determining a location of a filter film on a substrate in accordance with a first preferred embodiment.

Corresponding reference characters indicate corresponding parts throughout the drawings. The exemplifications set out herein illustrate at least one preferred embodiment of the present method, in one form, and such exemplifications are not to be construed as limiting the scope of the invention in any manner.

DETAILED DESCRIPTION OF THE INVENTION

References will now be made to the drawings to describe preferred embodiments of the present method, in detail.

Figure 2:
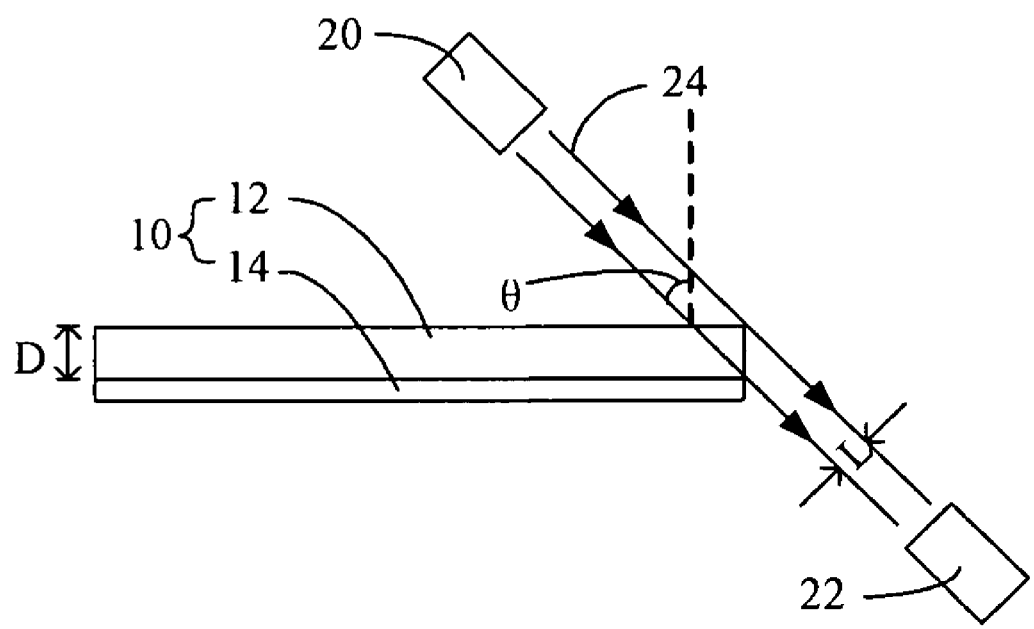

Referring to FIGS. 1 to 2, a method for determining a location of a filter film on a substrate according to a first preferred embodiment is shown. The filter film 14 and the substrate 12 cooperatively function as an IR-cut filter 10. The method includes the steps of:

(1) providing an IR laser device 20, an IR-cut filter 10, and an IR sensor 22;
(2) emitting an IR laser beam 24 to a surface of the IR-cut filter 10 in a manner such that the IR laser beam 24 is obliquely incident on an edge portion of the IR-cut filter 10 at an incident angle θ;
(3) determining the location of the filter film 14 on the substrate 12 of the IR-cut filter 10 by making judgment of the light intensity of the IR laser beam 24 received by the IR sensor 22;
(4) assembling the IR-cut filter 10 to a lens assembly.

In step (1), a wavelength of the laser beam 24 emitted from the IR laser device 20 is about 794 nanometers. The IR-cut filter 10 is arranged between the IR laser device 20 and the IR laser sensor 22, and the IR laser device 20 and the IR laser sensor 22 are aligned with each other.

The IR-cut filter 10 includes a substrate 12 and an IR-cut filter film 14. The IR-cut filter film 14 is attached on a surface of the substrate 12. A material of the substrate 12 is selected from the group consisting of glass, gelatin, and plastic, preferably glass. The IR-cut filter film 14 reflects IR light so as to avoid the IR light entering into the image sensor of an image pick-up device. Therefore, quality of resulting image is enhanced.

Figure 3:
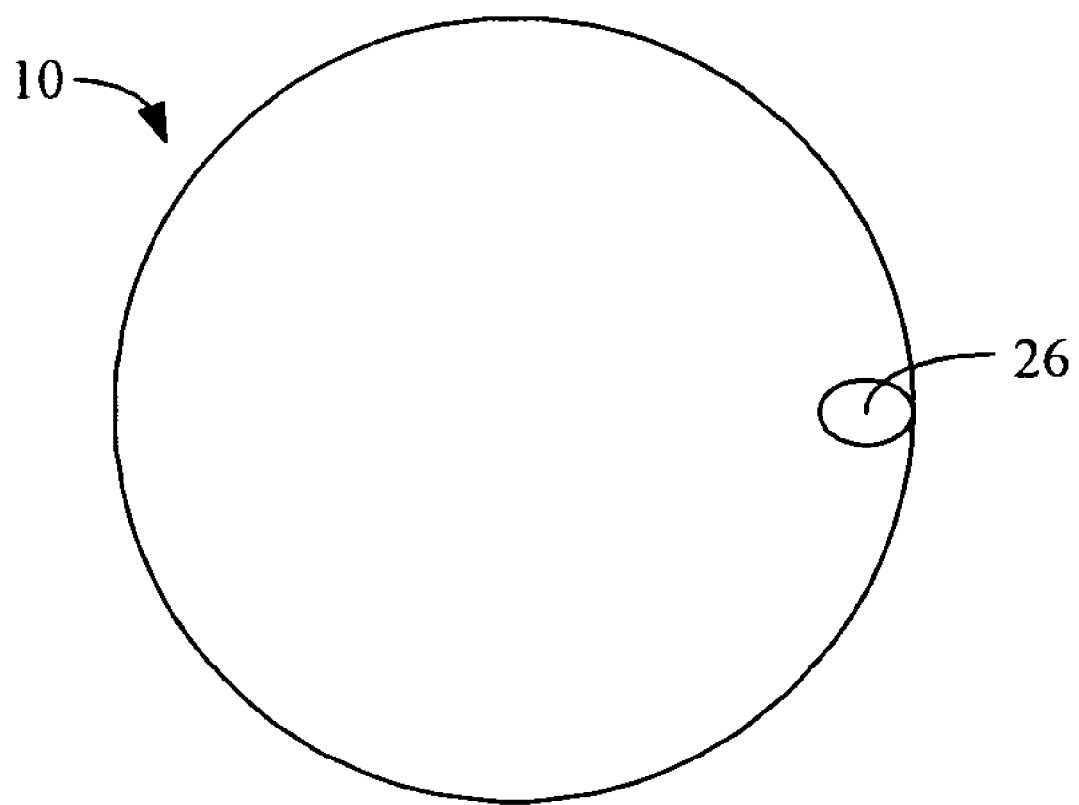
FIG. 3 is an explanatory view of a light pot formed on a edge portion of the substrate of FIG. 1 or FIG. 2.

In step (2), a width L of the laser beam 24 is satisfied by the following equation: L=D×sin θ, wherein D represents a thickness of the substrate 12. The incident angle θ is an acute angle. In this preferred embodiment, the incident angle θ is about 45 degrees. Therefore, the width L of the laser beam is equal to D/√2. The IR laser beam 24 is obliquely incident on an edge portion of the IR-cut filter 10, as shown in FIG. 3. To see if the IR laser beam 24 is obliquely incident on an edge portion of the IR-cut filter 10, an IR camera (not shown) may be arranged at the same side of the IR-cut filter 10 as the IR laser device 20 to watch over a laser spot 26 formed on the surface of the IR-cut filter 10.

In step (3), since the IR laser beam 24 is obliquely incident on the edge portion of the IR-cut filter 10, a light intensity of the laser beam 24 received by the IR sensor 22 is different if a location of the filter film 14 is on a surface of the substrate 12 facing towards the IR laser device 20 or facing towards the IR sensor 22.

Referring to FIGS. 1 to 2 again, if the width L of the laser beam 24 emitted from the IR laser device 20 is equal to D/√2, and the light intensity of the IR laser beam received by the IR sensor 22 is equal to or close to zero, the IR laser beam 24 cannot pass through the IR-cut filter 10. Therefore, the location of the filter film 14 is on a surface of the substrate 12 facing the IR laser device 20. If the width L of the laser beam 24 emitted from the IR laser device 20 is equal to D/√2, and the light intensity of the IR laser beam 24 received by the IR sensor 22 is the same as or close to a light intensity of the IR laser beam 24 emitted from the IR laser device 20, the IR laser beam 24 passes through the IR-cut filter 10 and is nearly received by the IR sensor 22. Therefore, the location of the filter film 14 is on a surface of the substrate 12 facing the IR sensor 22. Accordingly, the location of the filter film 14 on the substrate 12 is determined by making judgment of the light intensity of the IR laser beam 24 received by the IR sensor 22.

in step (4), a set of the determined IR-cut filters 10 are arranged on a supporting table (not shown) in a manner that the oriented direction of the location of the filter film 14 on the substrate 12 are identical. Therefore, in the process of assembling the IR-cut filter to a lens module, the oriented directions of the location of the filter film 14 on the substrate 12 of the IR-cut filters 10 are kept identical to make sure of the optical consistency of each lens module. The direction of orientation of the location of filter film 14 on the substrate 12 of the IR-cut filter 10 may face an object side or an image side of the lens module.

Figure 4:
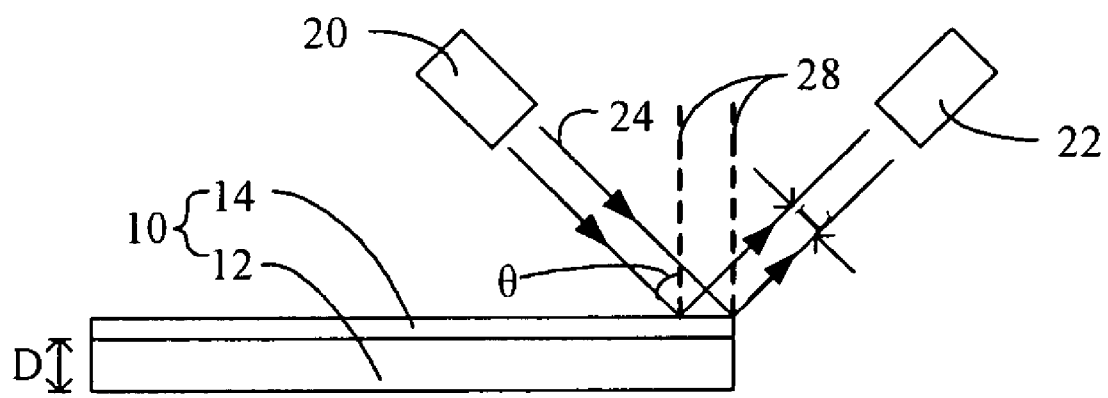
FIGS. 4 to 5 are explanatory views of a method for determining a location of a filter film on the substrate in accordance with a second preferred embodiment.
Figure 5:
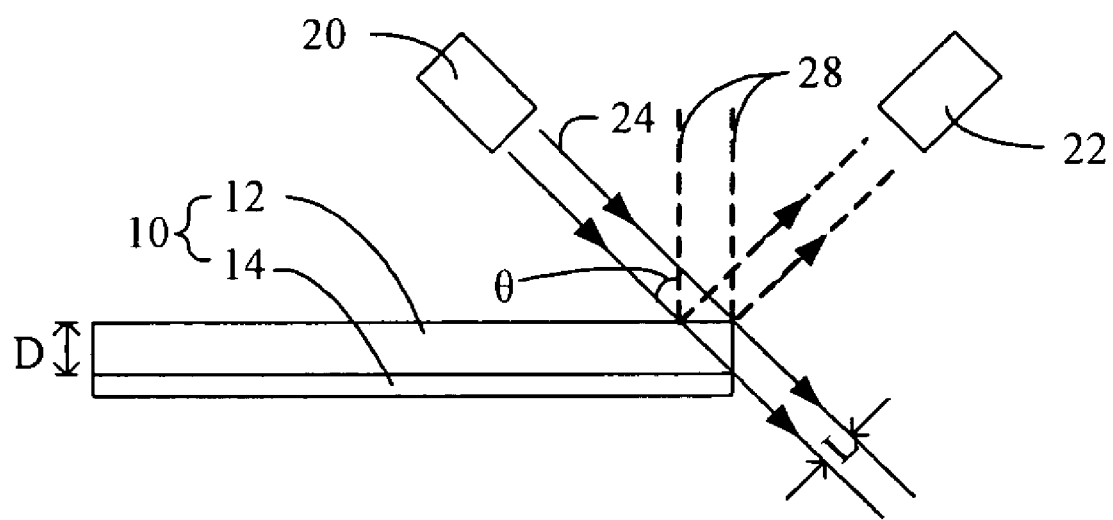

Referring to FIGS. 4 to 5, a method for determining a location of a filter film on a substrate according to a second preferred embodiment is shown. The filter film and the substrate cooperatively function an IR-cut filter. The difference between the methods according to the second preferred embodiment and the first preferred embodiment is that, in this preferred embodiment, the IR laser device 20 and the IR sensor 22 are arranged at a same side of the IR-cut filter 10, and the IR laser sensor 22 is configured for receiving the IR laser beam 24 reflected from the IR-cut filter 10.

The IR sensor 22 receives the IR laser beam 24 reflected by the surface of the IR-cut filter 10. If the light intensity of the IR laser beam 24 received by the IR sensor 22 is the same as or close to a light intensity of the IR laser beam 24 emitted from the IR laser device 20, the location of the filter film 14 is on a surface of the substrate 12 facing towards the IR laser device 20. If the light intensity of the IR laser beam 24 received by the IR sensor 22 is equal to or close to zero, the location of the filter film 14 is on a surface of the substrate 12 away from the IR laser device 20. Accordingly, the location of the filter film 14 on the substrate 12 may be determined.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A method for determining location of an infrared-cut (IR-cut) filter film on a substrate, the filter film and the substrate cooperatively functioning as an IR-cut filter, the method comprising the steps of:

providing an infrared laser device, the filter and an infrared laser sensor, the IR-cut filter being arranged between the IR laser device and the IR laser sensor, the IR laser device and the IR laser sensor being aligned with each other;

emitting an infrared laser beam from the IR laser device to a surface of the IR-cut filter in a manner such that the infrared laser beam is obliquely incident on an edge portion of the IR-cut filter at an incident angle θ, and a width L of the infrared laser beam satisfies the following equation:

$L=D\times\sin\theta$, wherein,

D represents a thickness of the substrate; and determining the location of the filter film on the substrate in such a way that, if a light intensity of the infrared laser beam received by the infrared sensor is equal to or close to zero, the IR-cut filter film is on a surface of the substrate facing the infrared laser device, if the light intensity of the infrared laser beam received by the infrared sensor is equal to or close to a light intensity of the infrared laser beam emitted from the infrared laser device, the filter film is located on a surface of the substrate facing towards the infrared laser sensor.

2. The method as claimed in claim 1, wherein the incident angle θ of the infrared laser is about 45 degrees.

3. The method as claimed in claim 1, wherein a wavelength of the infrared laser is about 794 nanometers.

4. A method for determining location of an IR-cut filter film on a substrate, the filter film and the substrate cooperatively functioning an IR-cut filter, the method comprising the steps of:

providing an infrared laser device, the IR-cut filter and an infrared laser sensor, the infrared laser device being configured emitting an infrared laser beam onto the filter, the infrared laser sensor being configured for receiving the infrared laser beam reflected from the filter;

emitting an infrared laser beam from the IR laser device to a surface of the IR-cut filter in a manner such that the infrared laser beam is obliquely incident on an edge portion of the IR-cut filter at an incident angle $\theta$, and a width L of the infrared laser beam satisfies the following equation:

$L=D\times\sin\theta$, wherein,

D represents a thickness of the substrate; and determining the location of the filter film on the substrate in such a way that, if a light intensity of the infrared laser beam received by the infrared sensor is equal to or close to a light intensity of the infrared laser beam emitted from the infrared laser device, the filter film is located on a surface of the substrate facing the infrared laser device; if the light intensity of the infrared laser beam received by the infrared sensor is equal to or close to zero, the filter film of the substrate is located on a surface of the substrate facing away from the infrared laser device.

5. The method as claimed in claim 4, wherein the incident angle $\theta$ of the infrared laser is about 45 degrees.

6. The method as claimed in claim 4, wherein a wavelength of the infrared laser is about 794 nanometers.

7. A method for determining location of a filter film on a substrate, the filter film being for blocking light of a predetermined wavelength from passing therethrough, the filter film and the substrate cooperatively functioning as a filter, the method comprising the steps of:

emitting a light beam of the predetermined wavelength with a first light intensity in a manner such that the light beam is obliquely incident on an edge portion of the substrate at a first side thereof;

receiving the light beam with a second light intensity reflected from or transmitting through and exiting from the edge portion of the substrate; and determining the location of the filter film on the substrate based on a difference between the first and second light intensity of the light beam.

8. The method as claimed in claim 7, further comprising a step of assembling the filter to a lens assembly.

9. The method as claimed in claim 7, further comprising the steps of comparing the first light intensity with the second light intensity, if the first light intensity is less than the second light intensity, the filter film is located at an opposite second side of the substrate, if the first light intensity is approximately equal to the second light intensity, the filter film is located at the first side of the substrate.

* * * * *